United States Patent [19]

Tonkovich

[11] 4,081,649

[45] Mar. 28, 1978

[54] SEAM ROLLER FOR TUBE MILL

[75] Inventor: Frank Tonkovich, Riverdale, Ill.

[73] Assignee: Allied Tube & Conduit Corporation, Harvey, Ill.

[21] Appl. No.: 711,528

[22] Filed: Aug. 4, 1976

[51] Int. Cl.² ............................................. B23K 31/06
[52] U.S. Cl. ..................................... 219/61.1; 219/67; 219/61.7
[58] Field of Search ...................... 219/59, 67; 228/200

[56] References Cited

U.S. PATENT DOCUMENTS

| 2,400,889 | 5/1946 | Ridder | 219/59 |
| 3,131,285 | 4/1964 | Kohler | 219/59 X |

Primary Examiner—E. A. Goldberg
Attorney, Agent, or Firm—Fitch, Even, Tabin & Luedeka

[57] ABSTRACT

A tube mill which employs circular rotating electrodes for welding the edge seam along with means within the continuous tube for rolling the welded seam. An arm extends into the tube and carriers a rotating roller that contacts the seam just downstream from the point where welding occurs. A connector affixed to the arm extends upward through the region between the converging edges of the strip to a pivot pin. An air cylinder is arranged to rock the arm about the pivot pin and force the roller upward against the undersurface of the hot seam close to the circular welding electrodes to produce a smooth surface. The upper section of the arm carries a pair of rotatable discs of different thicknesses which guide the converging edges of the strip into proper position for welding. The arm carries a pipe which directs fluid past the roller to blow weld spatter downstream while simultaneously cooling the roller. Preferably, an inert gas flow is maintained past the roller at a velocity between 500 and 3000 feet per second.

11 Claims, 6 Drawing Figures

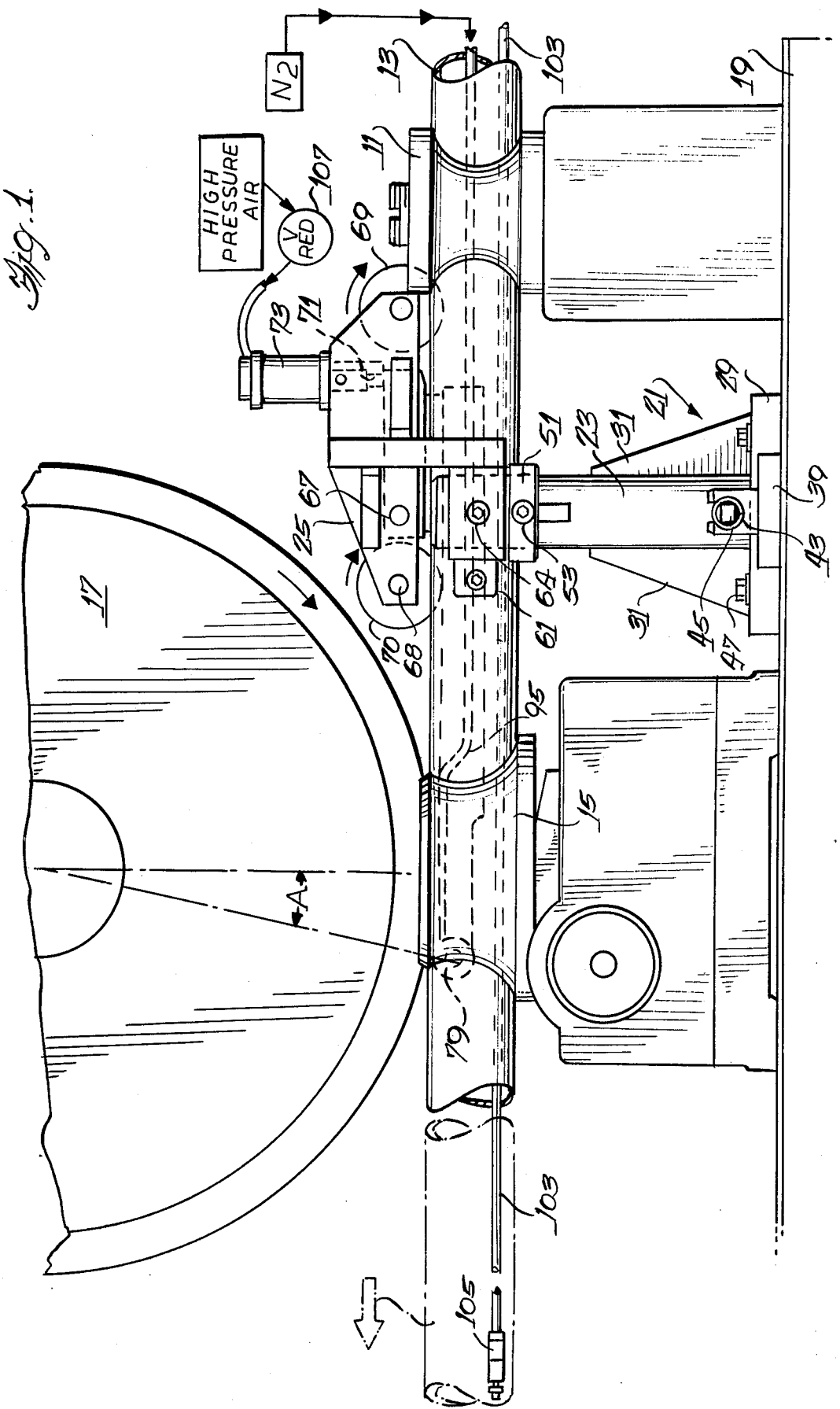

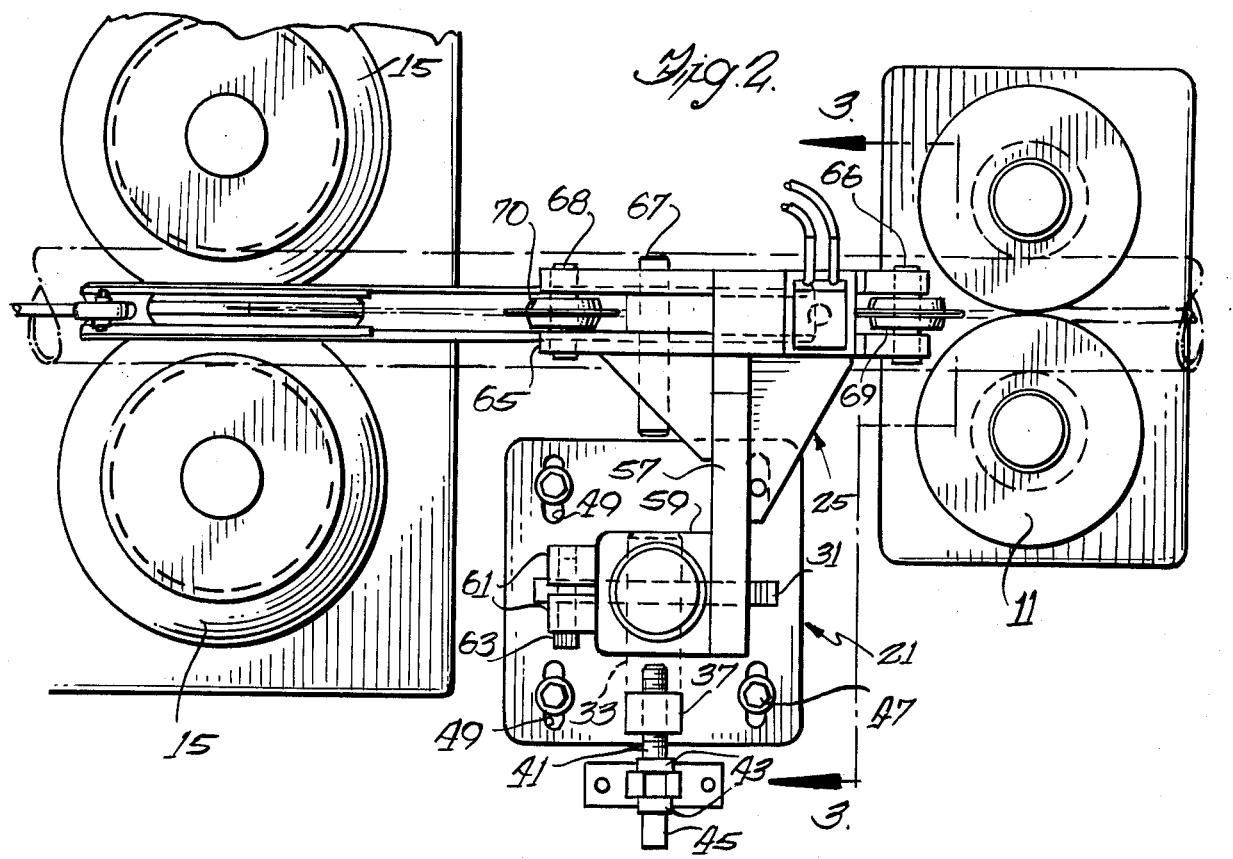
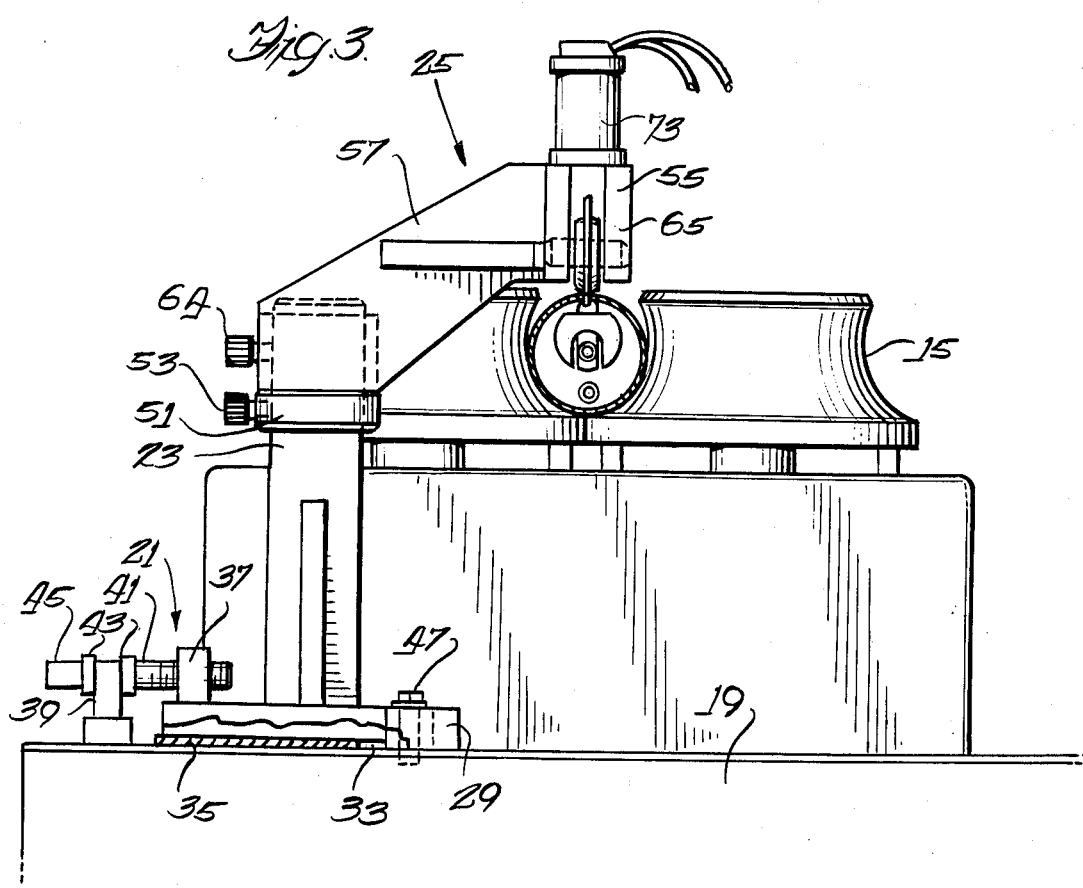

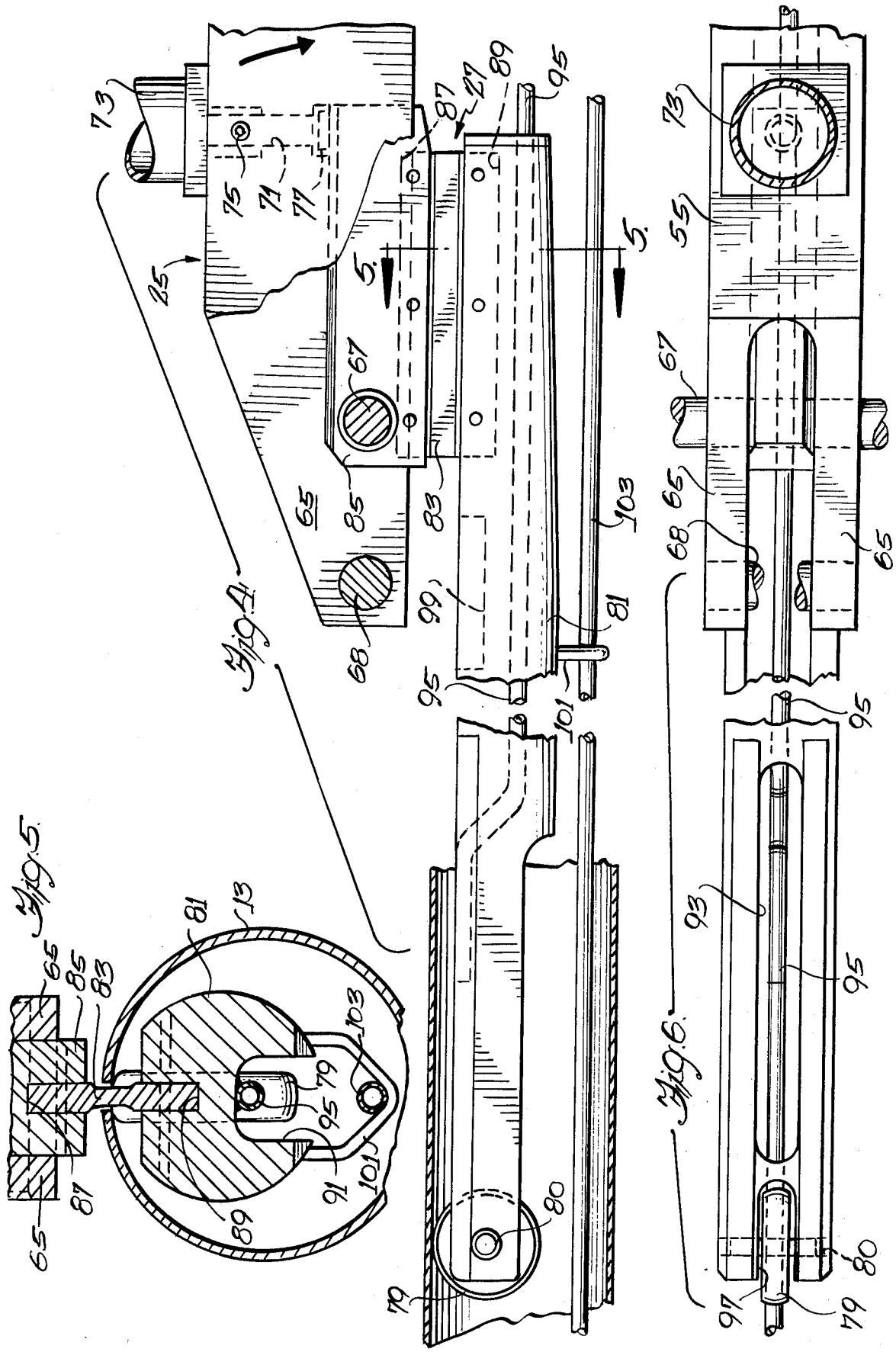

SEAM ROLLER FOR TUBE MILL

The present invention relates to the formation of continuous tubular material from steel strip and more specifically to apparatus for welding the seam of a steel tube at the end of a roll-forming operation and rolling the welded seam to provide a smooth finished interior surface at the weld.

It is, of course, well known to form continuous tubing from steel strip by welding a seam at the end of a tube mill operation, using a pair of slightly spaced apart circular electrodes, as taught for example in U.S. Pat. No. 3,256,592 to Krengel et al., issued June 21, 1966. The exterior surface of the tubing may subsequently be continuously galvanized, as also disclosed in this patent, and the interior of the tubing may additionally be suitably coated, as for example taught in U.S. Pat. No. 3,768,145 to Ostrowski, issued Oct. 30, 1973.

Prior to the application of any exterior coating, it is desirable that the seam area be treated so as to provide as smooth a surface as possible, and the Krengel et al. patent teaches the use of a seam-shaver, downstream of the seam welder. Likewise, there have been various devices proposed for treating the interior surface of the seam, which is of course far less accessible then the exterior surface, and examples of some devices are shown in U.S. Pats. Nos. 1,837,494, 1,867,529, 1,812,409, and 2,400,889. However, industry has constantly striven to make improvements in this general area, and further improvements continue to be desired.

It is an object of the present invention to provide an improved continuous tube-forming apparatus wherein a welded seam having a smooth-finished, interior surface is created in the continuous tubing. A further object of the invention is to provide an improved seam roller which cooperates with a pair of circular welding electrodes to provide a smooth finished interior surface in continuous tubing being fabricated. Still another object of the invention is to provide an improved and simplified apparatus for finishing and coating the interior surface of continuously welded tubing.

These and other objects of the invention will be apparent from the following detailed description of apparatus embodying various features of the invention when read in conjunction with the accompanying drawings wherein:

FIG. 1 is a front view of a portion of a tube mill embodying various features of the invention, with parts of the tubing being formed shown in phantom;

FIG. 2 is a plan view of part of the apparatus shown in FIG. 1, with the tubing being shown in phantom and with the circular welding electrodes omitted;

FIG. 3 is a vertical sectional view taken generally along the lines 3—3 of FIG. 2 with the right hand tube-forming rolls omitted for clarity;

FIG. 4 is an enlarged fragmentary elevation view of the seam roller device shown in FIG. 1, with portions shown in section and other portions broken away to better illustrate the various details;

FIG. 5 is an enlarged sectional view taken along the line 5—5 of FIG. 4, and

FIG. 6 is an enlarged bottom view of the seam roller device shown in FIG. 4, with the steel tubing and the lower coating spray pipe completely omitted.

The invention provides an internal seam roller device which operates in very close proximity to the circular welding electrodes so that the electrodes serve as the backup for the exterior of the tubing against which the rolling force is exerted. Moreover, the rolling of the interior seam region in extremely close proximity to the point of welding provides contact with the hot weld metal at a time when it remains easily formable and, as a result, creates a smooth finished surface. The operation of the seam roller in such close proximity to the high temperature welding operation is made possible by the cooling arrangement that forms a part of the overall combination. Moreover, the particular structural configuration combines the seam roller with rotatable guides for the edges of the strip being welded to assure that the precision desired is accomplished.

In the view depicted in FIG. 1, the last set of driven rolls 11 of the tube mill are shown which form the originally flat, horizontal steel strip 13 into a nearly closed tubular shape as the steel strip is caused to move from right to left therethrough. At this point, as best seen in FIGS. 2 and 3, the edges of the steel strip are still slightly spaced apart from each other which is, of course, in accordance with the design of the rolls. As depicted in the phantom representation of the tubing in FIG. 2, the slightly-spaced apart edges continue to converge until they reach the final set of rolls 15 which are arranged to rotate about parallel axes which lie in the same plane as the axis of a pair of overhead circular welding electrodes 17. Such circular welding electrodes are well known in the art and have suitably curved contact surfaces which engage the surface of the steel strip being formed at locations very close to its edges. The circular electrodes 17 are suitably spaced apart and insulated from each other; they are not themselves usually driven but are allowed to rotate freely about the horizontal axis, being turned by the longitudinally moving tubular surface of the steel strip.

The tube mill rollers 11 and the final pair of driving rollers 15, as well as the circular electrodes 17, are all mounted on a longitudinally extending base 19 and are suitably interconnected (not shown) with a mechanical drive for pulling the strip 13 being formed and transporting the tubing in a longitudinal direction, as is well known in the art. Also mounted on the base 19 at a location between the last set of rolls 11 of the tube mill and the final pair of driving rollers 15 is a mounting fixture 21 which holds an upstanding vertical post 23 that carries a holder 25 near its upper end which supports a device 27 for rolling the interior seam of the continuous length of tubing.

The lower end of the vertical post 23 fits snuggly into a bore provided in a flat plate 29 which forms the bottom of the fixture. A pair of triangular gussets 31 are suitably connected to the plate 27 and the post 23, as by welding, so as to assure the post is perpendicular to the plate. A slot 33 is milled out of the undersurface of the plate 29 (see FIGS. 2 and 3), and a thin bar or key 35 suitably affixed to the upper surface of the machine base 19. The key 35 slidably interfits within the milled slot 33 and allows movement of the fixture 21 in a direction only at right angles or normal to the longitudinal direction of the tubing that is being formed.

In order to achieve precise positioning of the fixture 21, a lug 37 having a threaded hole is affixed to the upper surface of the bottom plate 27, and a guide bracket 39 is suitably bolted to the machine base 19 in alignment with the threaded lug 37. An adjusting screw 41 is provided which has a threaded end that is received in the threaded lug 37, and a pair of collars 43 which are spaced apart a suitable distance to allow an unthreaded portion of the screw to be received in the bifurcated upper end of the bracket 39. The outer end of the adjusting screw 41 is machined to have a square cross section 45. Accordingly, once the guide bracket 39 is bolted to the base 19, turning the square end 45 of the adjusting screw 41 with a wrench will cause the fixture 21 and its vertical post 23 to slide either toward or away from the path of the strip 13 being formed, being guided by the milled slot 33 and its cooperating guide bar 35. Once in the desired position, the fixture is secured by tightening bolts 47 which reside in elongated holes 49 in the bottom plate 29.

The holder 25 for the seam-roller device 27 is mounted atop the round post 23 and is located at the proper vertical level by a supporting collar 51 which is maintained in place by a socket-head screw 53 that serves as a setscrew. The holder 25 includes a housing 55 which is supported vertically above the longitudinally moving steel strip 13 that is being formed into a tube, as a result of the housing's being welded to one end of a plate 57 that at its other end is welded to a clamping block 59. The clamping block 59 is split and carries a pair of lugs 61 at its lefthand side (see FIG. 2) which contain a pair of drilled holes, one of which is threaded to receive a clamping screw 63. A setscrew 64 may also be provided in the clamping block to assure precise positioning angularly on the post 23. The upper housing portion 55 of the holder 25 is formed with an upper central portion from which a pair of side plates 65 depend. These side plates 65 contain three sets of aligned drilled holes which receive pins 66,67,68.

The central pin 67 serves as the pivot pin about which the seam roller device 27 rocks, and the upstream and downstream pins 66,68 carry rotatable seam guides 69,70 in the form of circular discs which assure precise positioning and separation of the converging edges of the steel strip 13 that is being formed. The seam guides 69,70 incorporate suitable bushings which are press-fit onto the pins, and the disc portions are suitably affixed to the outer race of the bushings to assure their precise location. The upstream seam guide 69, which is supported on the pin 66, has a disc portion that is thicker than the disc portion of the downstream seam guide 70 to take into account the convergence of the strip that is being guided. The upper section of the housing 55 contains a vertical bore 71 on its center line (see FIG. 1) which has an upper counterbored portion. A pneumatic cylinder 73 is supported atop this section having a depending sleeve portion that is received in the counterbore. A pair of tapped holes in the housing 55 lead into the counterbore from opposite sides and contain setscrews 75 which clamp the sleeve portion of the pneumatic cylinder 73 in position. The piston 77 of the pneumatic cylinder 73 is slidably received in the bore 71 through which it extends as explained hereinafter.

The seam roller device 27 includes a roller 79 which is rotatably supported on a shaft 80 that is mounted in the bifurcated downstream end of an elongated arm 81. The arm is joined at its upstream end by an intermediate connector 83 to an upper pressure bar 85 which resides in an open region of the holder between the depending parallel side plate 65. The pressure bar 85 (see FIG. 4) is pivotally mounted about the central pin 67 of the holder via a suitable bushing, and the right-hand or upstream end of the pressure bar 67 extends rearward to a location below the bore 71 wherein the pneumatic cylinder piston 77 slidably travels. The pressure bar 67 contains a milled slot 87 at its bottom into which the upper end of the intermediate connector 83 is receive and suitably affixed, as by three pins. The lower end of the intermediate connector 83 is received in a similar slot 89 in the upstream end of the arm 81 and is suitably affixed therein by three pins.

As shown in FIG. 5, the intermediate connector 83 narrows in its central section to provide clearance for the coverging edges of the strip 13. The width of the upstream end of the central section of the connector 83 is slightly less than the width of the disc which constitutes the upstream rotating guide 69, and the thickness of this necked-down central section tapers from upstream end to the downsteam end to provide appropriate clearance throughout its length.

As best seen in FIG. 5, the elongated arm 81 is formed from a piece of circular bar stock having a diameter equal to about two-thirds of the inner diameter of the steel tubing that is being formed, so as to assure adequate clearance. A downwardly open groove or tunnel 91 is milled in the underside of the arm 81 which begins at the righthand end or upstream end of the arm and extends for the major part of its length. Near the downstream end of the arm 81, the entire lower portion is removed, and a large elongated aperture or slot 93 is formed which extends completely vertically through the arm, as best seen in FIGS. 4 and 6. A small diameter pipe 95, which serves as the cooling gas line, is located in the tunnel 91 and is tack-welded to the upper surface thereof as shown in FIG. 5. Near its downstream end, the pipe 95 is bent upward to follow the transition from the tunnel into the slot 93 and terminates short of the point where welding occurs, pointing in a horizontal direction aimed at the seam roller 79. A short slot 97 is milled in the downstream end of the arm to provide clearance for the rotating roller 79 which is journalled on the carbide shaft or pin 80 that is suitably affixed in drilled holes in the bifurcated downstream end of the arm. An extremely close tolerance is specified for the outer diameter of the carbide shaft 80 and the inner diameter of the seam roller 79 so that no bearing is needed and the seam roller 79 will remain centered within the slot 97. An additional keyway 99 is cut in the intermediate upper portion of the arm 81 to provide clearance for the lower edge of the guide disc 70.

Preferably, a support 101 is provided from the bottom of the arm 81 for a lower coating supply line 103 which is located near the bottom of the tubing that is being formed and extends downstream to a location well beyond the seam roller 79. The coating supply line terminates in a sparay nozzle 105, see FIG. 1, which is designed to direct a uniform layer of the coating material about the entire interior circumference of the welded tube.

As depicted in FIG. 1, the centerline of the welding electrodes 17 lies in the same plane as the vertical axes of the cooperating two forming rollers 15. It is at about the intersection of this vertical plane with the tubular strip 13 that the welding of the now adjacent edges takes place. The length of the cooling gas pipe 95 is such that it terminates a short distance upstream of this vertical plane where the point of welding occurs. Moreover, and importantly, the arm 81 is proportioned so that the seam roller 79 is located just downstream of the intensely hot point of welding at a location where the welded tubing is still very close to the periphery of the circular electrodes. For reference purposes, FIG. 1 is shown with a line that represents the plane passing through the horizontal axis of the circular electrodes 17 and the point where there is contact between the outer surface of the seam roller 79 and the weld, and the angle between this plane and the previously indicated vertical plane wherein the approximate point of welding is located is marked by the letter A. This angle A should not be greater than 30° and is preferably less than 20°.

As best seen in FIGS. 5 and 6, the outer surface of the roller 79 is concave and has a radius of curvature less than the radius of curvature of the interior of the tubing being formed. Two advantages of locating the seam roller 79 very closely downstream of the point of welding are that no separate exterior backup is required (because of the proximity of the circular electrodes 17 and the inherent stiffness of the steel tubing), and that the temperature of the weld metal constituting the seam is still so high that the metal is quite malleable, allowing it to be rolled very smoothly at this location.

Normally, it could be expected that weld spatter would be carried downstream to contaminate the roller 79 or that the roller would quickly overheat and become either corroded or otherwise ineffective, because of the intense heat in this region. However, it has been found that the flow of cooling fluid through the pipe 95 overcomes both of these potential difficulties. Preferably, an inert gas, such as nitrogen or argon, is used so that no undesirable reaction occurs at the point of welding; hoever, if no further interior coating or exterior galvanizing is to be carried out, a liquid such as water might be used as the cooling fluid, Inert gas is preferably supplied at a pressure so that it is discharged from the end of the pipe 95 and travels past the point of welding and the seam roller 79 at a velocity between about 500 and about 3000 feet per second (about 150 and about 900 meters per second). This flow of cooling gas effectively deflects and displaces all of the weld spatter past the seam roller 79 and eventually out the end of the tubing being formed, and it also maintains the seam roller at a temperature low enough to assure its longevity in effectively smoothing of the interior surface of the seam.

The force by which the seam roller 79 bears against the interior surface of the hot metal seam is controlled by the fluid-actuated cylinder 73 which is preferably a pneumatic cylinder. The cylinder 73 may be single-acting, and the force which the seam roller exerts is controlled by the amount of air pressure applied to the upper or blind end of the cylinder. The cylinder 73 is connected to a source of high pressure air through an adjustable reducing valve 107 which allows close regulation of the air pressure supplied to the pneumatic cylinder and accordingly regulation of the force with which the roller 79 bears against the seal. Adjustments are made to the air pressure via the adjustable valve 107 to achieve the smoothness desired in the welded tubing. Moreover the valve 107 may be designed to interrupt and to dump the air pressure, and thus remove all force upon the seam roller 79 should the operation of the tube mill be halted for any reason.

The positioning of the fluid-actuated cylinder 73 and the overall construction of the seam roller device 27 allows extremely efficient overall operation because, in addition to facilitating the effective application of force by the seam roller 79 at the desired location just downstream of the point of welding, the pair of edge guide discs 69 and 70 are very effective in precisely locating the edges of the steel strip 13 in the desired locations and aligning them in preparation for the welding operation. Overall, the apparatus provides a relatively simple, yet very effective and substantially maintenance-free, operation for forming steel tubing with an extremely smooth interior surface that can be uniformly coated with a thin layer of paint, lacquer or the like. Moreover, the arrangement is particularly suited for using a solvent-based coating material because the continuous high velocity discharge of inert gas through the pipe 95 carries the solvent vapors downstrean and thus safely away from the high temperatures which are in existence at the point of welding.

Although the invention has been described with regard to certain preferred embodiments, it should be understood that various modifications as would be obvious to one having the ordinary skill in the art may be made without deviating from the scope of the invention which is set forth solely in the appended claims. For example, although a fluid-actuated cylinder is preferably used, some other suitable force-applying device could be substituted for the cylinder; for instance, one may employ a rotatable cam, a screw of an adjustable wedge. Various of the features of the invention are set forth in the claims which follow.

What is claimed is:

1. The combination of a tube mill for rolling a metallic strip into a circular cross section tubular shape, a circular rotating electrode device for welding the edges of said strip together at a seam, and means supported within said welded continuous tube for rolling said seam, wherein the improvement comprises said seam-rolling means including an arm extending into said tube which is being formed and carrying a roller which is rotatively supported thereon, said arm being located so that said roller contacts said seam at a position just downstream from the point where welding occurs, connector means affixed to said arm extending outward of said tube which is being formed through the region between the converging edges of said strip to a location where it is pivotally mounted on pin means carried by a support, force-applying means also carried by said support and located to bear against said arm in a manner to rock said arm about said pivot pin and force said roller against the interior surface of said hot seam in general alignment with said circular welding device so that the still hot weld metal is rolled to a smooth finished surface, a pipe carried by said arm having an open and directed downstream toward said roller, which pipe terminates at a location upstream of the point of welding, and means for providing fluid flow through said pipe so as to displace weld spatter downstream past said roller while simultaneously cooling said roller.

2. The invention in accordance with claim 1 wherein said force-applying means is a fluid-actuated device.

3. The invention in accordance with claim 1 wherein said fluid-actuated device is a pneumatic cylinder.

4. The invention in accordance with claim 3 wherein means is provided for interrupting supply of air to said pneumatic cylinder should operation of said tube mill be halted.

5. The invention in accordance with claim 1 wherein said connector means extends vertically downward from said pivot point, wherein said arm contains a downwardly open groove in the upstream portion thereof wherein said pipe is disposed and also contains aperture means leading from said groove to the upper surface of said arm, said pipe being bent so as to extend through said aperture means to a location adjacent said upper surface.

6. The invention in accordance with claim 1 wherein said connector means includes a thin section which resides in said open region between the converging edges of said strip and which thin section is integral with upper and lower sections of enlarged dimensions.

7. The invention in accordance with claim 6 wherein said enlarged upper section of said arm carries a pair of rotatable guide discs, the lower portions of which guide discs reside in the region between the converging edges of the strip, the upstream disc of said pair being greater in thickness than said intermediate section of said connector and said pair of discs serving to guide the edges of said strip into proper position for welding.

8. The invention in accordance with claim 6 wherein said intermediate section is tapered in a longitudinal direction and also serves as a guide.

9. The invention in accordance with claim 1 wherein the pair of planes which contain the horizontal axis about which said electrode device rotates and either the point of welding or the point at which said seam roller contacts the weld are separated by an angle of less than 20°.

10. The invention in accordance with claim 1 wherein said fluid-flow providing means provides inert gas at a pressure which creates a velocity of gas flow past said roller between about 500 and about 3000 feet per second.

11. The invention in accordance with claim 10 wherein said arm also supports a tube which extends beneath and past said roller to a downstream location and terminates in means for spraying a coating material uniformly onto the interior of said formed continuous tube including the smooth-rolled seam.

* * * * *